(12) United States Patent
Beyer et al.

(10) Patent No.: US 7,832,530 B2
(45) Date of Patent: Nov. 16, 2010

(54) PISTON ROD GUIDE, IN PARTICULAR FOR A SINGLE-TUBE VIBRATION DAMPER

(75) Inventors: Holger Beyer, Pfarrweisach (DE); Bernd Christau, Luelsfeld (DE); Heiko Erfurth, Walldorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 313 days.

(21) Appl. No.: 11/988,527

(22) PCT Filed: Aug. 18, 2006

(86) PCT No.: PCT/EP2006/008156

§ 371 (c)(1),
(2), (4) Date: Jan. 9, 2008

(87) PCT Pub. No.: WO2007/025652

PCT Pub. Date: Mar. 8, 2007

(65) Prior Publication Data

US 2009/0205914 A1 Aug. 20, 2009

(30) Foreign Application Priority Data

Aug. 31, 2005 (DE) .................. 10 2005 041 230

(51) Int. Cl.
*F16F 9/36* (2006.01)
(52) U.S. Cl. .................................. 188/322.17
(58) Field of Classification Search .............. 188/315, 188/322.16–322.18
See application file for complete search history.

(56) References Cited

U.S. PATENT DOCUMENTS 3,812,938 A 5/1974 Fader et al.
4,166,523 A * 9/1979 Fujii et al. ............. 188/322.17
4,360,192 A * 11/1982 Ishida .................... 267/64.28
4,527,673 A * 7/1985 Szcupak ..................... 188/269
5,531,299 A * 7/1996 Bataille ................. 188/322.17
6,666,439 B2 12/2003 Römer
7,311,181 B2 12/2007 Germano et al.

FOREIGN PATENT DOCUMENTS

DE 43 26 197 2/1996

(Continued)

OTHER PUBLICATIONS

Search Report dated Dec. 1, 2006 corresponding to the International Application No. PCT/EP2006/008156.

*Primary Examiner*—Christopher P Schwartz
(74) *Attorney, Agent, or Firm*—Cohen Pontani Lieberman & Pavane LLP

(57) ABSTRACT

The invention relates to a vibration damper, comprising a cylinder (5) that is filled with damping medium, in which a piston rod (7) is guided in an axially movable manner by a piston rod guide (3), the lateral surface of the piston rod guide lying against an inner wall of the cylinder (5) and the piston rod guide being sealed in the direction of a working area at the piston rod end, the area of contact between the lateral surface (17) and the cylinder (5) relative to the working area (11) at the piston rod end having on the other side of the sealing area (23) at least one outlet (25, 29) in the direction of an outer end face (31) of the vibration damper.

8 Claims, 2 Drawing Sheets

FOREIGN PATENT DOCUMENTS

| | | |
|---|---|---|
| DE | 198 03 174 | 9/1998 |
| DE | 199 19 189 | 11/2000 |
| DE | 100 35 391 | 2/2001 |
| DE | 102 05 264 | 8/2003 |
| DE | 10 2004 003 132 | 8/2005 |
| EP | 0 959 264 | 11/1999 |

* cited by examiner

PISTON ROD GUIDE, IN PARTICULAR FOR A SINGLE-TUBE VIBRATION DAMPER

CROSS REFERENCE TO RELATED APPLICATIONS

This is a U.S. national stage of International Application No. PCT/EP2006/008156, filed on 18 Aug. 2006. Priority is claimed on German Application No. 10 2005 041 230.0, filed on 31 Aug. 2005.

BACKGROUND OF THE INVENTION

1. Field of the Invention

The invention pertains to a vibration damper having a cylinder with an inside wall surrounding a working space; a piston rod guide having an outside surface which rests against the inside wall of the cylinder adjacent to the working space, the guide having an internal end surface facing the working space and an external end surface facing away from the working space; and a seal between the outside surface of the piston rod guide and the inside wall of the cylinder.

2. Description of the Related Art

In vibration dampers of the single-tube design, all the components and the working media are installed or added through the open end of the cylinder. In many cases, only the open area near the piston rod guide is available. The piston rod guide has a first groove on the outside diameter for a sealing ring and a second groove, offset axially toward the outer end surface, into which certain parts of the cylinder are lock-beaded to hold the piston rod guide axially in place. During assembly, the vibration damper must be completely filled with oil, which means that the cylinder will contain a certain excess amount of oil. During the installation of the piston rod guide, therefore, a certain amount of this damping medium can make its way into the second groove, especially because of the effect of the installing device, which is wetted with the damping medium. During the lock-beading operation, some of the damping medium present in the second groove is displaced toward the end surface. This excess damping medium can be removed easily from the external surfaces. The damping medium still remaining in the second groove, however, is more critical. During the further course of the assembly process and also at a later time, especially during installation of the vibration damper in the motor vehicle, the damping medium trapped in the second groove can escape through the gap between the cylinder and the piston rod guide and reach the end surface. The purely superficial impression can thus be created that the vibration damper is leaking. Only an inspection in a testing machine can determine whether or not the vibration damper is in fact defective or whether it merely presents the appearance of a defect.

Thought has already been given to the possibility of locating the second groove with the lock-beading near the working space on the piston rod side and the first groove for the seal near the end surface of the vibration damper. It this case, however, it is still possible for very fine cracks to be formed in the cylinder during the lock-beading operation—cracks which can lead afterwards to a leak in the vibration damper.

SUMMARY OF THE INVENTION

The task of the present invention is to eliminate the problem presented by the contamination of a vibration damper with oil during the assembly operation.

According to the invention, this task is accomplished in that the contact area between the outer surface of the piston rod guide and the cylinder has at least one drain passage, which is located on the side of the sealing area facing away from the piston-rod side working space and which leads toward an outer end surface of the vibration damper.

The great advantage is that the oil which collects between the piston rod guide and the inside wall of the cylinder during the course of the assembly work will be able to escape during the fabrication process itself.

In a first embodiment of the invention, the drain passage is formed by at least one axial channel.

It has been found to be advantageous to provide a plurality of axial channels on a reference circle in such a way that the outer surface can continue to exert a reliable positioning function.

Series of experiments have shown that the axial channels can be comparatively shallow. So that the axial channels can be made as quickly and as easily as possible, the axial channels are formed as a knurled profile.

There is also the option of producing the minimum of one axial channel either in the outer surface of the piston rod guide or in the inside wall of the cylinder.

It also possible for the piston rod guide to have a circumferential groove in its outer surface and for the minimum of one axial channel to extend from the groove to the end surface. The groove assumes a collecting function for the minimum of one axial channel. This groove can also be used for the radial lock-beading of the cylinder into the piston rod guide for the purpose of axial fixation.

Alternatively, the circumferential groove provided in the outer surface of the piston rod guide can have a certain circumferential section which is axially offset sufficiently to reach the end surface.

DETAILED DESCRPTION OF THE PREFERRED EMBODIMENTS

Figure 1:
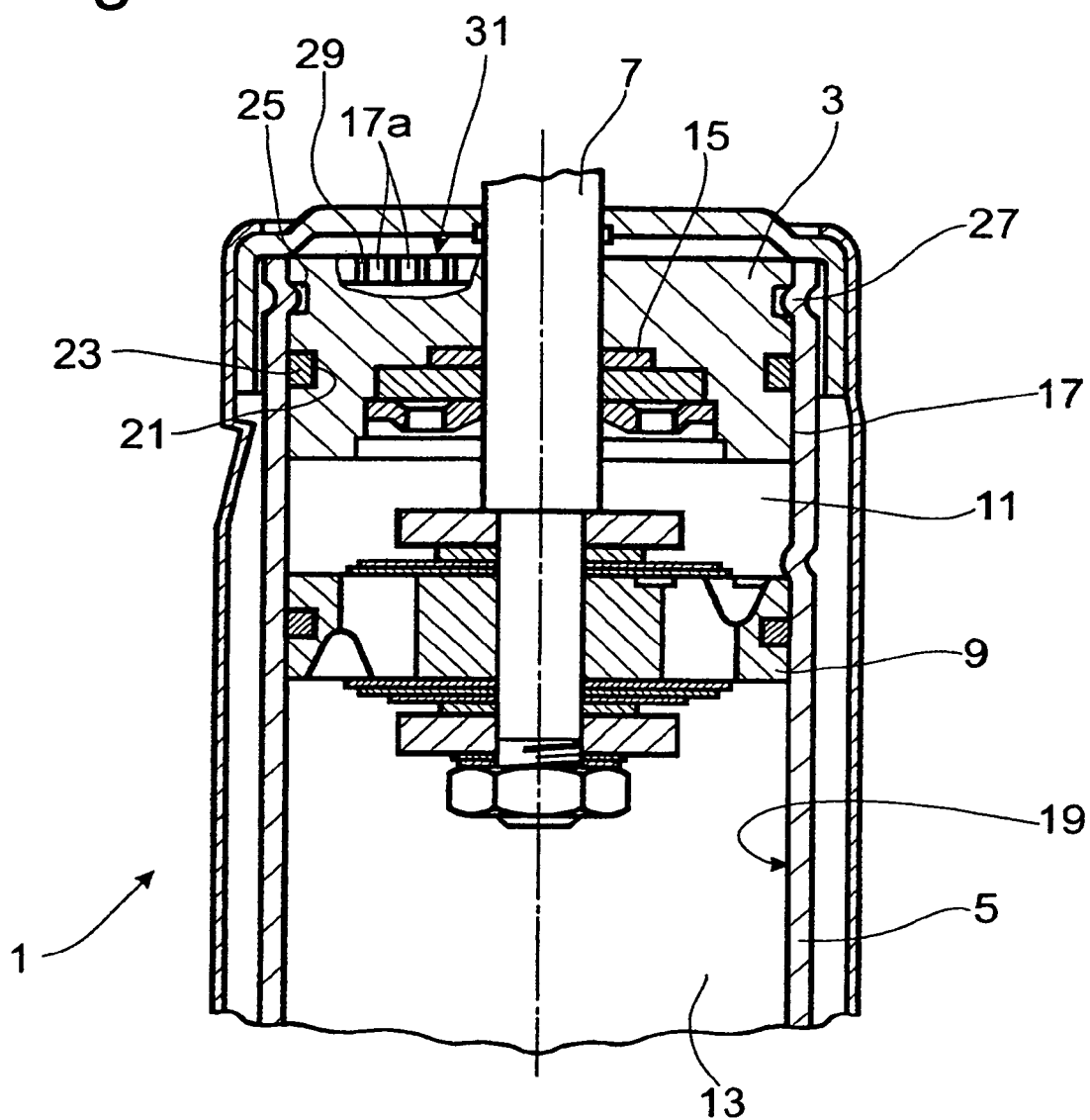
FIG. 1 shows a vibration damper with at least one axial channel between the piston rod and the cylinder.

FIG. 1 is limited to a diagram of the area of a vibration damper 1 where the piston rod guide 3 is located. The vibration damper comprises a cylinder 5, in which a piston rod 7 with its piston 9 is free to move in the axial direction. The piston 9 divides the cylinder, which is filled with damping medium, preferably a hydraulic damping medium, into a working space 11 on the piston rod side and a working space 13 on the side opposite the piston rod. The piston rod guide 3 centers the piston rod 7 and has on its inside diameter a piston rod seal 15. By way of its outer surface 17, the piston rod guide 3 is supported radially against an inside wall 19 of the cylinder.

A cylinder seal 23 is captured in a first groove 21 of the piston rod guide 3, so that damping medium cannot escape from the cylinder 5 during the operation of the vibration damper.

During the assembly of the vibration damper, the cylinder 5, which is open at one end, is filled with the oily damping medium. Then the piston together with the piston rod is pushed into the cylinder. This assembly step can be carried out while the cylinder is in either a horizontal or a vertical position. In either case, damping medium will be present in the assembly device which is used to hold the cylinder. Then the piston rod guide 3 is pushed onto the piston rod until the piston rod guide has reached the final assembly position shown. In this state of assembly, oil will have collected under certain conditions between the outer surface 17 of the piston rod guide and the inside wall 19 of the cylinder on the other side of the seal 23 facing away from the piston-rod side working space 11. The oil will collect especially in the second groove 25, which accepts a number of the lock-beads 27, which are used to hold the piston rod guide axially in position inside the cylinder.

This oil present between the inside wall 19 and the outer surface 17 is carried away through at least one drain passage in the form of an axial channel 29 leading to an outer end surface 31 of the vibration damper and can be easily removed from there during the further course of the fabrication process. The minimum of one axial channel 29 extends from the second groove 25 to the end surface 31. In this diagram, several axial channels are arranged on a reference circle in such a way that that the outer surface sections 17a remaining between the axial channels are of sufficient size to ensure that the piston rod guide will be effectively centered inside the cylinder. Alternatively, the axial channels can also be made in the inside wall 19 of the cylinder. The individual axial channels can be produced in a single work step by a knurling operation as described in, for example, DIN 82.

Figure 2:
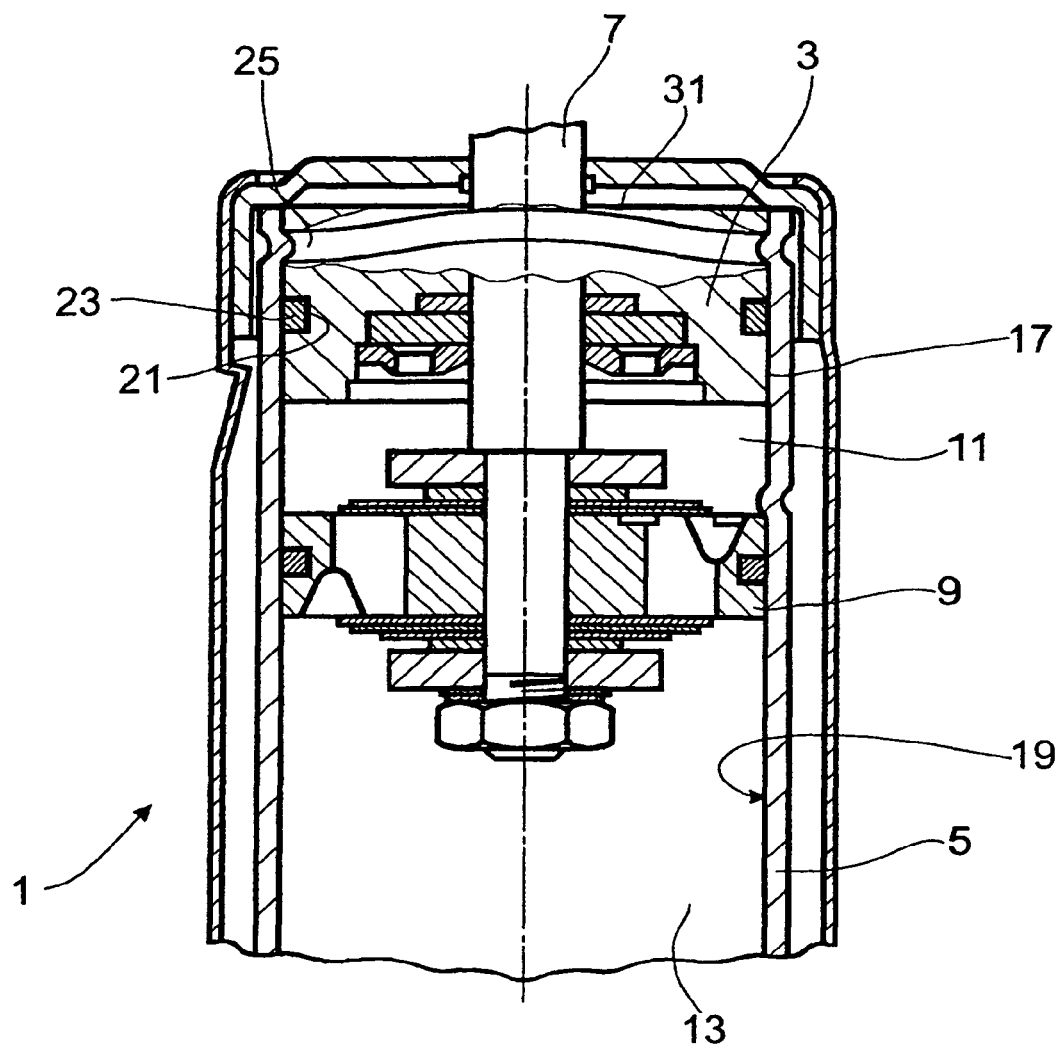
FIG. 2 shows a piston rod guide with a groove with an axially offset section in a certain circumferential area.

As an alternative to the axial channel 29, the variant according to FIG. 2 shows a second groove 25, a certain circumferential section of which is offset sufficiently to reach the end surface 31. This groove can have a wave-like profile, for example. A wave-shaped groove 25 of this type can be easily produced and offers the advantages that there is no need for a separate work step to produce an axial channel 29 and that a comparatively large cross section can be made available for the discharge of the excess oily damping medium from the contact area between the inside wall 19 of the cylinder 5 and the outer surface 17 of the piston rod guide 3.

What is claimed is:

1. A vibration damper comprising:
   a cylinder having an inside wall surrounding a working space;
   a piston rod guide having an outside surface which rests against the inside wall of the cylinder adjacent to the working space, the guide having an internal end surface facing the working space and an external end surface facing away from the working space;
   a seal between the outside surface of the piston rod guide and the inside wall of the cylinder; and
   a drain passage at a contact area between the outside surface of the piston rod guide and the inside wall of the cylinder located between the seal and the external end surface, the drain passage extending to the external end surface.

2. The vibration damper of claim 1 wherein the drain passage comprises at least one axial channel.

3. The vibration damper of claim 2 wherein the drain passage comprises a plurality of axial channels arranged on a reference circle.

4. The vibration damper of claim 3 wherein the axial channels form a knurled profile.

5. The vibration damper of claim 2 wherein said at least one axial channel is formed in the outside surface of the piston rod guide.

6. The vibration damper of claim 2 wherein said at least one axial channel is formed in the inside wall of the cylinder.

7. The vibration damper of claim 2 wherein the piston rod guide has a circumferential groove in said outside surface, said at least one axial channel extending from said groove to said external end surface.

8. The vibration damper of claim 1 wherein said piston rod guide is formed with a circumferential groove having a section which reaches said external end surface to form said drain passage.

* * * * *